US009478127B2

(12) United States Patent
Shimotani et al.

(10) Patent No.: US 9,478,127 B2
(45) Date of Patent: Oct. 25, 2016

(54) CENTER-SIDE SYSTEM AND VEHICLE-SIDE SYSTEM

(75) Inventors: Mitsuo Shimotani, Tokyo (JP); Hidehiko Ohki, Tokyo (JP); Makoto Mikuriya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 96 days.

(21) Appl. No.: 14/240,297

(22) PCT Filed: Dec. 28, 2011

(86) PCT No.: PCT/JP2011/080388
§ 371 (c)(1),
(2), (4) Date: Feb. 21, 2014

(87) PCT Pub. No.: WO2013/098989
PCT Pub. Date: Jul. 4, 2013

(65) Prior Publication Data
US 2014/0207362 A1 Jul. 24, 2014

(51) Int. Cl.

| | |
|---|---|
| ***B60L 9/00*** | (2006.01) |
| ***B60L 11/00*** | (2006.01) |
| ***G05D 1/00*** | (2006.01) |
| ***G05D 3/00*** | (2006.01) |
| ***G06F 7/00*** | (2006.01) |
| ***G06F 17/00*** | (2006.01) |
| ***G08G 1/00*** | (2006.01) |

(Continued)

(52) U.S. Cl.
CPC .......... *G08G 1/00* (2013.01); *G08G 1/096716* (2013.01); *G08G 1/13* (2013.01)

(58) Field of Classification Search
None
See application file for complete search history.

(56) References Cited

U.S. PATENT DOCUMENTS 6,532,414 B2 * 3/2003 Mintz ...................... G08G 1/01 340/934
6,542,808 B2 * 4/2003 Mintz ...................... G08G 1/01 340/934
8,255,162 B2 8/2012 Okude et al.

(Continued)

FOREIGN PATENT DOCUMENTS

CN 101363737 A 2/2009
JP 10-255191 A 9/1998

(Continued)

OTHER PUBLICATIONS

International Search Report issued in PCT/JP2011/080388, dated Apr. 10, 2012.

*Primary Examiner* — Adam Tissot
*Assistant Examiner* — Tommy Worden
(74) *Attorney, Agent, or Firm* — Birch, Stewart, Kolasch & Birch, LLP

(57) ABSTRACT

An object of the present invention is to provide a technology capable of estimating a waiting time at an energy refilling facility for each of drive types. A center-side system includes a center-side receiver that receives, from a vehicle-side system, probe vehicle position information and drive type information that is information regarding a drive type of a probe vehicle. Then, the center-side system includes: a traffic condition estimation unit that estimates a traffic condition, which includes a drive type-classified number of vehicles, based on the probe vehicle position information and the drive type information, which are received by the center-side receiver; and a center-side transmitter that transmits, to an outside, the traffic condition estimated by the traffic condition estimation unit.

3 Claims, 13 Drawing Sheets

(51) Int. Cl.
*G08G 1/13* (2006.01)
*G08G 1/0967* (2006.01)

(56) References Cited

U.S. PATENT DOCUMENTS 8,620,569 B2 12/2013 Taguchi
2002/0077742 A1* 6/2002 Mintz ...................... G08G 1/01 701/117
2002/0082767 A1* 6/2002 Mintz ...................... G08G 1/01 701/117
2005/0099323 A1* 5/2005 Hirose ................. G08G 1/0969 340/995.13
2006/0082472 A1* 4/2006 Adachi ............ G08G 1/096716 340/995.13
2006/0122846 A1* 6/2006 Burr ................... G01C 21/3492 342/357.31
2009/0012667 A1* 1/2009 Matsumoto .......... G05D 1/0251 701/26
2009/0048775 A1 2/2009 Okude et al.
2009/0076774 A1 3/2009 Miyajima
2009/0140887 A1* 6/2009 Breed .................. G01C 21/165 340/990
2011/0015851 A1* 1/2011 Burr ................... G01C 21/3492 701/117
2011/0060495 A1* 3/2011 Kono .................. B60W 40/072 701/31.4
2011/0288765 A1* 11/2011 Conway ............. G01C 21/3469 701/533
2012/0133497 A1* 5/2012 Sasaki ................ G06K 9/00805 340/425.5
2015/0356868 A1* 12/2015 Cuende Alonso ..... G01C 21/36 382/104

FOREIGN PATENT DOCUMENTS

JP 2005-339279 A 12/2005
JP 2006-113889 A 4/2006
JP 2009-9298 A 1/2009
JP 2009-42051 A 2/2009
JP 2009-75647 A 4/2009
JP 2010-237182 A 10/2010
JP 2011-95959 A 5/2011
WO WO 2011/074096 A1 6/2011

* cited by examiner

FIG. 2

| ITEM | STATE |
|---|---|
| DRIVE TYPE | EV |
| VEHICLE ID | AA-0001 |
| MODEL NUMBER | Type_AA |
| CHARGING INLET | CON1 |
| TRAVELING SPEED | 80 Km/h |
| FULL-CHARGE TRAVELING DISTANCE | 150Km |
| CHARGE POSSIBLE TRAVELING DISTANCE | 70Km |
| CHARGING PLAN | CHARGING FACILITY 2 |
| GASOLINE CAPACITY | — |
| FUEL RESIDUAL QUANTITY | — |
| REFUELING PLAN | — |
| DESTINATION | BB |
| CURRENT POSITION | ○ |

FIG. 3

| ITEM | STATE |
|---|---|
| DRIVE TYPE | PHEV |
| VEHICLE ID | BB-0010 |
| MODEL NUMBER | Type_BB |
| CHARGING INLET | CON2 |
| TRAVELING SPEED | 80 Km/h |
| FULL-CHARGE TRAVELING DISTANCE | 100Km |
| CHARGE POSSIBLE TRAVELING DISTANCE | 40Km |
| CHARGING PLAN | CHARGING FACILITY 2 |
| GASOLINE CAPACITY | 50L |
| FUEL RESIDUAL QUANTITY | 20L |
| REFUELING PLAN | REFUELING FACILITY C |
| DESTINATION | BB |
| CURRENT POSITION | O |

F I G. 4

| ITEM | STATE |
|---|---|
| DRIVE TYPE | ENGINE (GASOLINE) |
| VEHICLE ID | CC-0025 |
| MODEL NUMBER | Type_CC |
| CHARGING INLET | — |
| TRAVELING SPEED | 80 Km/h |
| FULL-CHARGE TRAVELING DISTANCE | — |
| CHARGE POSSIBLE TRAVELING DISTANCE | — |
| CHARGING PLAN | — |
| GASOLINE CAPACITY | 50L |
| FUEL RESIDUAL QUANTITY | 20L |
| REFUELING PLAN | REFUELING FACILITY C |
| DESTINATION | BB |
| CURRENT POSITION | O |

FIG. 7

| DRIVE TYPE | THE NUMBER OF VEHICLES FROM POINT 0 TO SA1 | THE NUMBER OF VEHICLES FROM SA1 TO SA2 | VEHICLES TO BE CHARGED AT SA2 |
|---|---|---|---|
| ENGINE VEHICLE | 35 | 35 | — |
| PHEV | 5 | 5 | — |
| EV | 10 | 10 | 5 |
| TOTAL | 50 | 50 | — |

FIG. 8

| DRIVE TYPE | THE NUMBER OF VEHICLES FROM POINT 0 TO SA1 | THE NUMBER OF VEHICLES FROM SA1 TO SA2 | VEHICLES TO BE CHARGED AT SA2 |
|---|---|---|---|
| ENGINE VEHICLE | 20 | 10 | — |
| PHEV | 25 | 10 | — |
| EV | 5 | 30 | 15 |
| TOTAL | 50 | 50 | — |

| | FROM POINT O TO SA1 | FROM SA1 TO SA2 |
|---|---|---|
| THE NUMBER OF VEHICLES | 50 | 50 |

FIG. 11

| DRIVE TYPE | DRIVE TYPE RATIO (%) | THE NUMBER OF VEHICLES FROM POINT 0 TO SA1 | THE NUMBER OF VEHICLES FROM SA1 TO SA2 |
|---|---|---|---|
| ENGINE VEHICLE | 60 | 30 | 30 |
| PHEV | 30 | 15 | 15 |
| EV | 10 | 5 | 5 |
| TOTAL | — | 50 | 50 |

CENTER-SIDE SYSTEM AND VEHICLE-SIDE SYSTEM

TECHNICAL FIELD

The present invention relates to a center-side system and a vehicle-side system in a probe information system.

BACKGROUND ART

Nowadays, there is proposed a probe information system including: a probe vehicle that acquires and uploads traffic information of a road on which the probe vehicle is traveling; and a center-side system (for example, a traffic condition providing system) that transmits (distributes) a traffic condition, which includes congestion information, to respective vehicles, based on the traffic information. In accordance with this technology, the respective vehicles, which have received the traffic condition from the center-side system, become capable of searching appropriate routes based on the congestion information included in the traffic condition, and become capable of arriving at a destination or the like in a short time. Note that, nowadays, the probe vehicle is applied only to a part of vehicles such as vehicles, which are ready for a telematics service of a car manufacturer, buses, and taxis; however, it is estimated that the probe vehicle will be applied also to general vehicles.

There is a case where, in the probe information system as described above, the traffic information (probe information) acquired by the probe vehicle is inaccurate or inappropriate. In such a case, it sometimes takes longer to arrive at the destination or the like when the vehicle travels through the searched route than when the vehicle travels through other routes, and as a result, the respective vehicles sometimes become incapable of traveling through the appropriate routes.

Accordingly, a variety of technologies are proposed in order to solve such a problem as described above. For example, in Patent Document 1, there is disclosed a technology for adjusting the probe information in such a manner that probe information indicating an abnormal operation such as abnormal stop is prevented from being used. Moreover, a variety of technologies which follow the above-described technology are also proposed. For example, in Patent Document 2, a technology for collecting drive history information of a driver is disclosed.

PRIOR ART DOCUMENT

Patent Document

Patent Document 1: Japanese Patent Application Laid-Open No. 2009-9298

Patent Document 2: Japanese Patent Application Laid-Open No. 2009-075647

SUMMARY OF INVENTION

Problems to be Solved by the Invention

However, in the conventional probe information system as described in Patent Document 1 and Patent Document 2, the provision of the condition with regard to the number of vehicles on the road for each of drive types is not performed, and a waiting time of the vehicle at an energy refilling facility has not been able to be measured for each of the drive types.

In this connection, the present invention has been made in consideration of the problem as described above, and an object of the present invention is to provide a technology capable of estimating the waiting time at the energy refilling facility for each of the drive types.

Means for Solving the Problems

A center-side system according to the present invention is a center-side system in a probe information system, the center-side system receiving upload of traffic information from a vehicle-side system mounted on a probe vehicle, and includes a receiver that receives, from the vehicle-side system, vehicle position information that is information regarding a position of the probe vehicle, and drive type information that is information regarding a drive type of the probe vehicle. Then, the center-side system includes: a traffic condition estimation unit that estimates a traffic condition, which includes a drive type-classified number of vehicles, which is the number of the vehicles for each of the drive types of the probe vehicles on each of roads, based on the vehicle position information received by the receiver and on the drive type information received by the receiver; and a transmitter that transmits, to an outside, the traffic condition estimated by the traffic condition estimation unit, or a browsing unit that makes it possible to browse the traffic condition by an access from the outside.

Effects of the Invention

In accordance with the present invention, each of the vehicles can acquire the drive type-classified number of vehicles, and accordingly, with reference to the acquired drive type-classified number of vehicles, can estimate the waiting time for energy refilling at the energy refilling facility for each of the drive types.

BRIEF DESCRIPTION OF DRAWINGS

FIG. 2 to 4 are views showing probe information to be generated by a vehicle-side system.

FIGS. 7 and 8 are views showing a drive type-classified number of vehicles according to the first preferred embodiment.

FIG. 11 is a view showing the drive type-classified number of vehicles according to the second preferred embodiment.

DESCRIPTION OF EMBODIMENTS

<First Preferred Embodiment>

Figure 1:
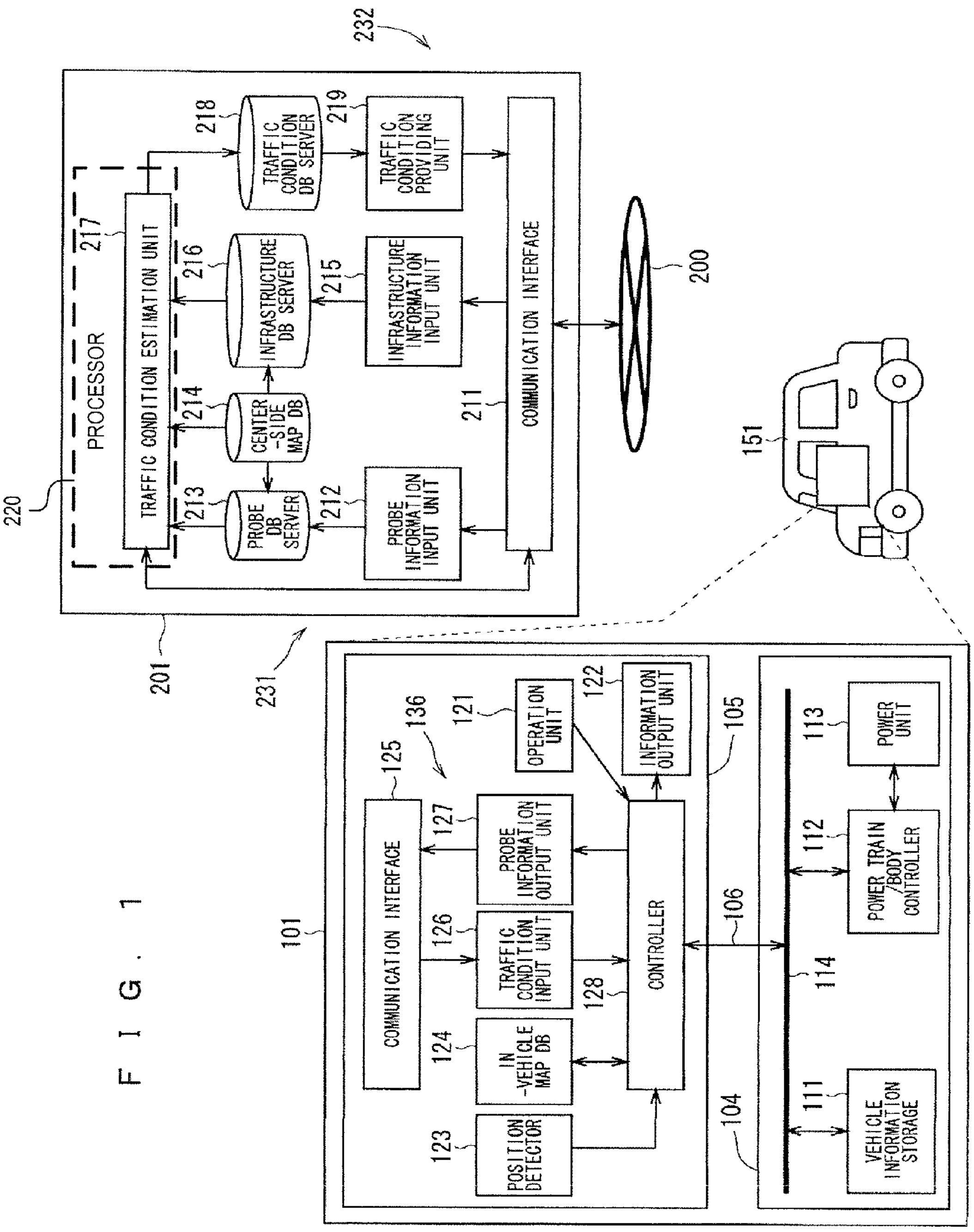
FIG. 1 is a block diagram showing a configuration of a probe information system according to a first preferred embodiment.

FIG. 1 is a block diagram showing a configuration of a probe information system according to a first preferred embodiment, which includes: vehicle-side system 101; and a center-side system 201.

The vehicle-side system 101 is mounted on a probe vehicle 151, and uploads traffic information (hereinafter, written as "probe information" in some cases) of a road, on which the probe vehicle 151 is traveling, to the center-side system 201. The center-side system 201 receives the upload of the traffic information from the vehicle-side system 101, and transmits a traffic condition estimated based on the traffic information (the probe information) to the outside (each of the vehicles). Note that the upload of the probe information is assumed to be performed through a communication network 200 (Internet, radio communication and the like).

A description is made below on the assumption that the probe vehicle 151 is any of an engine vehicle using only gasoline, a hybrid vehicle (HEV), a plug-in hybrid vehicle (PHEV), and an electric vehicle (EV) using a motor. However, the HEV resembles the PHEV in many points, and accordingly, a description of the HEV is omitted as appropriate in some cases.

Next, a description is sequentially made of configurations of the vehicle-side system 101 and the center-side system 201.

The vehicle-side system 101 includes: a vehicle controller 104 that controls the probe vehicle 151 based mainly on operations of a driver; a probe information terminal 105 that handles the probe information; and a control system-information system interface 106 that connects these to each other. Here, the description is made on the assumption that the probe information terminal 105 is a car navigation device, and that the control system-information system interface 106 is a wired communication instrument. Next, a description is made of respective constituent elements of the vehicle controller 104 and the probe information terminal 105.

The vehicle controller 104 includes: a vehicle information storage 111; a power train/body controller 112; and a power unit 113 that is a drive source to run the probe vehicle 151. As shown in FIG. 1, the vehicle information storage 111 and the power train/body controller 112 are made capable of performing input/output and control for various pieces of information through an in-vehicle LAN 114. Then, the in-vehicle LAN 114 and the probe information terminal 105 (here, the controller 128) are made capable of performing communication for the various pieces of information through the control system-information system interface 106.

The vehicle information storage 111 stores substantially unchangeable vehicle information regarding the probe vehicle 151. Hereinafter, the vehicle information stored in the vehicle information storage 111 is written as "stored vehicle information" in some cases.

The vehicle information storage 111 stores drive type information, which is information regarding a drive type of the power unit 113 (drive source) of the probe vehicle 151, as the stored vehicle information. In this embodiment, the drive type information is assumed to indicate any of an engine drive form of the engine vehicle using only gasoline, an HEV drive form of the HEV, a PHEV drive form of the PHEV, and an EV drive form of the EV.

Moreover, the vehicle information storage 111 also stores, as the stored vehicle information, a vehicle ID, model number, charging inlet (model of charging plug), gasoline capacity and full-charge traveling distance of the probe vehicle 151. Note that the gasoline capacity is information to be stored in the vehicle information storage 111, for example, in a case where the probe vehicle 151 is the engine vehicle or the PHEV (HEV), and indicates a maximum capacity of storable gasoline. Moreover, the full-charge traveling distance is information to be stored in the vehicle information storage 111, for example, in a case where the probe vehicle 151 is the PHEV (HEV) or the EV, and indicates a maximum distance at which the vehicle is assumed to be capable of traveling by using only electric power charged to the maximum.

The power train/body controller 112 is composed of an unillustrated power train controller and an unillustrated body controller. The power train controller is composed of a group of devices which control instruments relating to the traveling of the probe vehicle 151 based on operations and the like of the driver, which are received in unillustrated brake pedal, accelerator pedal, steering wheel and the like. Here, based on the operations of the driver, the power train controller controls the number of revolutions (rotation speed of wheels) of the engine, motor or the like of the power unit 113, brake-system devices and the like, and thereby controls a speed of the probe vehicle 151, controls an attitude of a shaft, and the like, and thereby controls a running direction of the probe vehicle 151, and so on.

The body controller is composed of a group of devices which control instruments, which do not directly relate to the traveling of the probe vehicle 151, in response to control signals to be generated in such a manner that the driver operates unillustrated operation inputting means, and for example, the body controller controls drive of a windshield wiper, transfer of lighting information, turning on of a direction indicator, opening/closing of a door, opening/closing of a window, and the like.

The power unit 113 is the drive source to run the probe vehicle 151, and in addition, has a detection function to detect variable vehicle information regarding the probe vehicle 151. The vehicle information detected by the power unit 113 is outputted to the power train/body controller 112, and is used in the power train/body controller 112 and the like. Hereinafter, the vehicle information to be detected by the power unit 113 is written as "detected vehicle information" in some cases.

In this embodiment, the power unit 113 (speed detector) detects, as the detected vehicle information, probe vehicle speed information that is information regarding a speed of the probe vehicle 151. Moreover, for example, in the case where the probe vehicle 151 is the engine vehicle or the PHEV (HEV), the power unit 113 detects, as the detected vehicle information, fuel residual quantity information (energy residual quantity information) that is information regarding fuel residual quantity (energy residual quantity) of the probe vehicle 151. Furthermore, for example, in the case where the probe vehicle 151 is the PHEV (HEV) or the EV, the power unit 113 detects, as the detected vehicle information, a charge possible traveling distance that is a maximum distance at which the vehicle is assumed to be capable of traveling by using only electric power charged at present.

Next, a description is made of the probe information terminal 105. As shown in FIG. 1, the probe information terminal 105 includes: an operation unit 121 such as an HMI (Human Machine Interface) that receives information operations such as destination input from the driver; an information output unit 122 that displays or notifies a variety of information; a position detector 123; an in-vehicle map DB (database) 124; a communication interface 125; a traffic condition input unit 126; a probe information output unit 127; and a controller 128 composed of a CPU or the like, which integrally controls these based on the operations and the like received by the operation unit 121.

The position detector 123 is composed of a GPS (Global Positioning System) device, a yaw rate sensor, an acceleration sensor and the like, and detects probe vehicle position information (vehicle position information) that is information regarding a position of the probe vehicle 151. This probe vehicle position information may be a coordinate position Pk=(xk, yk) of the probe vehicle 151 on the longitude and the latitude, or may be a link number of a road (road section) on which the probe vehicle 151 is located.

In the in-vehicle map DB 124, there is stored map data including: an absolute coordinate corresponding to the longitude and the latitude; information such as the link number regarding the road; and information regarding a facility settable as the destination (for example, information such as a specific name and common name of the facility, a coordinate position of the facility on the map, and the like).

The controller 128 has a navigation function to search a traveling route, through which the probe vehicle 151 should travel to the destination, and to guide the driver to the destination along the traveling route, by using the probe vehicle position information and the map data of this in-vehicle map DB 124.

Furthermore, for example, in the case where the probe vehicle 151 is the PHEV (HEV) or the EV, the controller 128 creates a charging plan (one type of an energy refilling plan), which indicates a charging facility from which the probe vehicle 151 should be charged, based on the traveling route and the above-mentioned stored vehicle information and detected vehicle information. In a similar way, for example, in the case where the probe vehicle 151 is the engine vehicle or the PHEV (HEV), the controller 128 creates a refueling plan (one type of an energy refilling plan), which indicates a refueling facility from which the probe vehicle 151 should be refueled, based on the traveling route and the above-mentioned stored vehicle information and detected vehicle information.

Moreover, the controller 128 acquires: the stored vehicle information including the drive type information stored in the vehicle information storage 111; the detected vehicle information including the probe vehicle speed information and the fuel residual quantity information, which are detected by the power unit 113; and the probe vehicle position information detected by the position detector 123, and generates the probe information including these pieces of information.

FIG. 2 to FIG. 4 are views showing examples of the probe information to be generated by the controller 128. FIG. 2 to FIG. 4 show the probe information, in which the drive type of the probe vehicle 151 is the EV drive form, the PHEV drive form (also the HEV drive form in a similar way), and the engine drive form, respectively.

The probe information shown in these drawings includes: a drive type (corresponding to the drive type information), the vehicle ID, the model number, the charging inlet, the full-charge traveling distance and the gasoline capacity, which are included in the stored vehicle information; and a traveling speed (corresponding to the probe vehicle speed information), the charge possible traveling distance and a fuel residual quantity (corresponding to the fuel residual quantity information), which are included in the detected vehicle information. Moreover, the probe information includes: the destination received by the operation unit 121; a current position (corresponding to the probe vehicle position information) detected by the position detector 123; and the charging plan or the refueling plan, which is created by the controller 128.

Returning to FIG. 1, the communication interface 125 communicates with the center-side system 201 and the like through the communication network 200. The traffic condition input unit 126 gives the information, which is received by the communication interface 125, to the controller 128. The probe information output unit 127 gives the information in the probe vehicle 151 (here, in the controller 128) to the communication interface 125, and the communication interface 125 transmits the information, which is from the probe information output unit 127, to the center-side system 201 and the like. Note that, here, the description is made on the assumption that the vehicle-side system 101 includes the traffic condition input unit 126; however, this traffic condition input unit 126 is not essential.

Incidentally, in this embodiment, the above-mentioned communication interface 125 and the probe information output unit 127 compose a vehicle-side transmitter 136. Then, the vehicle-side transmitter 136 composed as described above transmits probe information including the probe vehicle position information, the drive type information, the probe vehicle speed information and the fuel residual quantity information, to the center-side system 201 (outside of the vehicle) through the communication network 200.

Next, a description is made of a configuration of the center-side system 201. As shown in FIG. 1, the center-side system 201 includes: a communication interface 211; a probe information input unit 212; a probe DB server 213; a center-side map DB 214; an infrastructure information input unit 215; an infrastructure DB server 216; a traffic condition estimation unit 217; a traffic condition DB server 218; and a traffic condition providing unit 219. Note that, in this embodiment, the traffic condition estimation unit 217 integrally controls the center-side system 201. As shown in FIG. 1, the traffic condition estimation unit 217 is implemented by, or part of, a processor 220. Next, a description is made of respective constituent elements of the center-side system 201.

The communication interface 211 communicates through the communication network 200 with, besides the vehicle-side system 101 of the probe vehicle 151, other probe information system, a VICS (Vehicle Information and Communication System) (registered trademark) center, an RDS-TMC (Radio Data System-Traffic Message Channel) center or the like, any of which is not shown. Here, the communication interface 211 receives the probe information, which is transmitted from the vehicle-side system 101, through the communication network 200. The probe information to be received by the communication interface 211 may be probe information directly received from the vehicle-side system 101 of the probe vehicle 151, or may be probe information indirectly received from the vehicle-side system 101 through the other probe information system and the like.

The probe information input unit 212 gives the probe information, which is received by the communication interface 211, to the probe DB server 213. In the center-side map DB 214, map data similar to that in the in-vehicle map DB 124 is stored. The probe DB server 213 sets roads and pieces of time, which are included in the map data of the center-side map DB 214, as parameters, and thereby stores the probe information from the probe information input unit 212, for each of the roads and the pieces of time. In this event, the probe DB server 213 also sets the drive types, which are indicated by the drive type information, as parameters, and may thereby store the probe information for each of the drive types.

In this embodiment, the above-mentioned communication interface 211 and probe information input unit 212 compose a center-side receiver 231 that is a receiver. The center-side receiver 231 composed as described above directly or indirectly receives the probe information, which includes the probe vehicle position information, the drive type information, the probe vehicle speed information and the fuel residual quantity information, from the vehicle-side system 101.

The infrastructure information input unit 215 gives infrastructure information such as VICS information, which is received by the communication interface 211, to the infrastructure DB server 216.

The VICS information is information from the VICS center, and for example, includes possible traveling speeds for each of the roads, each of which is a maximum speed at which the traveling is assumed to be enabled under the current traffic condition, and the congestion information with regard to main roads. The infrastructure information is information from the VICS center and other probe information system, and for example, includes information indicating current date and time and weather for each of the roads. Note that suppliers of various pieces of information of the infrastructure information may be changed as appropriate, and the information indicating the weather may be supplied (transmitted) from the vehicle.

The infrastructure DB server 216 stores the infrastructure information from the infrastructure information input unit 215, while taking the roads and the time as the parameters in a similar way to the probe DB server 213.

Based on the probe vehicle position information and the drive type information, which are included in the probe information (probe information received by the center-side receiver 231) stored in the probe DB server 213, the traffic condition estimation unit 217 estimates a traffic condition (hereinafter, written as "distributed traffic condition" in some cases) including a drive type-classified number of vehicles, which is the number of vehicles for each of the drive types of the probe vehicles 151 on each of the roads (on each of the links). Here, the traffic condition estimation unit 217 may estimate the congestion information based on the infrastructure information from the VICS center, and the like, and may have the congestion information included in the distributed traffic condition. Note that a detailed description of this estimation of the drive type-classified number of vehicles in the traffic condition estimation unit 217 will be made later.

The traffic condition DB server 218 stores the distributed traffic condition, which is estimated by the traffic condition estimation unit 217, for each of the roads.

The traffic condition providing unit 219 gives the distributed traffic condition, which is stored in the traffic condition DB server 218, to the communication interface 211, and the communication interface 211 transmits (sends) the distributed traffic condition to the outside such as the vehicle-side system 101 of the probe vehicle 151 and the other probe information system.

In this embodiment, the communication interface 211 and the traffic condition providing unit 219, which are described above, compose a center-side transmitter 232 that is a transmitter. The center-side transmitter 232 composed as described above transmits (sends) the distributed traffic condition (distributed traffic condition stored in the traffic condition DB server 218) estimated by the traffic condition estimation unit 217 to the outside such as the vehicle-side system 101. Note that, in this embodiment, since the distributed traffic condition is stored in the traffic condition DB server 218 for each of the roads, the center-side transmitter 232 is made capable of transmitting the distributed traffic condition for each of the roads.

As a transmission method of the distributed traffic condition, for example, a method is used, in which the center-side transmitter 232 takes account of ID information for specifying each vehicle-side system 101 or the like, which serves as a transmission destination, to the distributed traffic condition, and transmits the ID information so that each vehicle-side system 101 and each probe information system can receive necessary distributed traffic condition. Alternatively, a method is used, in which the center-side transmitter 232 transmits the distributed traffic condition equally by broadcasting. In this case, each vehicle-side system 101 or the like, which serves as the transmission destination, is composed so as to determine and receive the necessary distributed traffic condition by itself.

Figure 5:
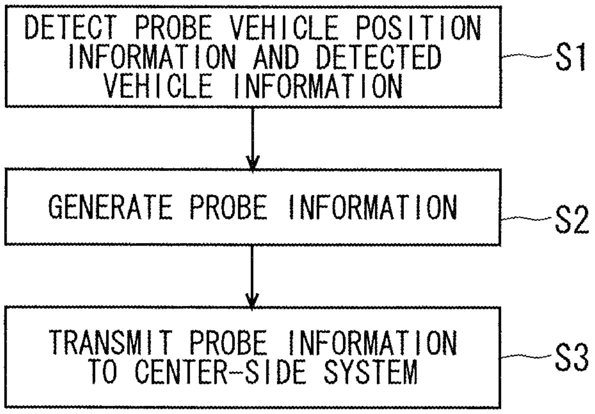
FIG. 5 is a flowchart showing processing of the vehicle-side system according to the first preferred embodiment.
Figure 6:
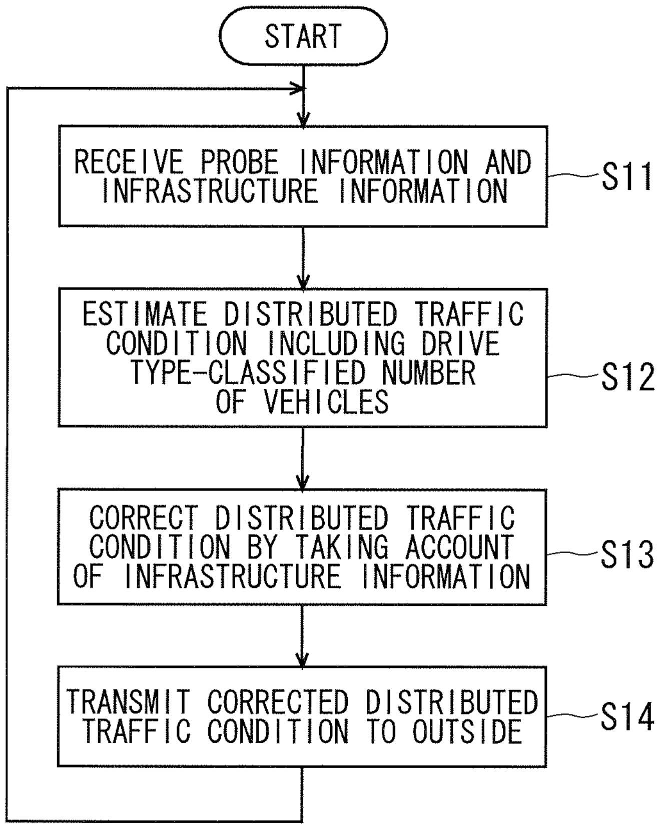
FIG. 6 is a flowchart showing processing of a center-side system according to the first preferred embodiment.

FIG. 5 and FIG. 6 are flowcharts showing processing of the probe information system according to this embodiment. In the following, first, the processing of the vehicle-side system 101 is described by using FIG. 5, and thereafter, processing of the center-side system 201 is described by using FIG. 6.

In Step S1 shown in FIG. 5, the position detector 123 detects the probe vehicle position information (here, the coordinate position Pk), and the power unit 113 detects the detected vehicle information.

In Step S2, the controller 128 acquires the probe vehicle position information from the position detector 123. Moreover, through the in-vehicle LAN 114 or the like, the controller 128 acquires the stored vehicle information from the vehicle information storage 111, and in addition, acquires the detected vehicle information from the power unit 113. Then, the controller 128 generates the probe information as shown in FIG. 2 to FIG. 4 from the information acquired here.

In Step S3, the vehicle-side transmitter 136 of the vehicle-side system 101 transmits the probe information, which is generated by the controller 128, to the center-side system 201. The vehicle-side system 101 performs the above-described processing of Steps S1 to S3 at a fixed time interval.

Next, the processing of the center-side system 201 is described by using FIG. 6.

In Step S11, the center-side receiver 231 directly or indirectly receives the probe information from the vehicle-side system 101, and gives the probe information to the probe DB server 213. The probe DB server 213 stores the probe information, which is given from the center-side receiver 231, in order of time series. Moreover, the infrastructure information input unit 215 gives the VICS information or the like, which is received by the communication interface 211, to the infrastructure DB server 216, and the infrastructure DB server 216 stores the VICS information or the like as the infrastructure information.

In Step S12, the traffic condition estimation unit 217 performs the estimation for the distributed traffic condition based on the probe information stored in order of time series in Step S11. Here, the traffic condition estimation unit 217 imparts the drive type information, which is included in the probe information, to a position indicated by the probe vehicle position information, which is included in the probe information, on the map indicated by the map data stored in the center-side map DB 214. The traffic condition estimation unit 217 performs this processing for the probe information from a plurality of the probe vehicles 151, and thereby estimates a distributed traffic condition including the drive type-classified number of vehicles, which corresponds to the distribution of the drive types on the map.

FIG. 7 and FIG. 8 are views showing the drive type-classified number of vehicles, which is included in the distributed traffic condition estimated by the traffic condition estimation unit 217 in Step S12. For example, the drive type-classified number of vehicles, which is shown in FIG. 7, shows that the number of engine vehicles, the number of PHEVs, and the number of EVs, all the vehicles being located on a road between a point O and a charging facility SA1, are 35, 5 and 10, respectively. Moreover, the drive type-classified number of vehicles, which is shown in FIG. 7, shows that the number of engine vehicles, the number of PHEVs, and the number of EVs, all the vehicles being located on a road between the charging facilities SA1 and SA2, are 35, 5 and 10, respectively.

Note that, in this embodiment, the traffic condition estimation unit 217 sums up the drive type-classified number of vehicles for each of the roads, and thereby estimates the total number of all the vehicles located on each of the roads. In the example shown in FIG. 7, for the road between the point O and the charging facility SA1, the traffic condition estimation unit 217 sums up 35, 5 and 10, which are shown by the drive type-classified number of vehicles, and thereby estimates that the total number of all the vehicles located on the road is 50. Moreover, in the example shown in FIG. 7, in a similar way, for the road between the charging facilities SA1 and SA2, the traffic condition estimation unit 217 sums up 35, 5 and 10, which are shown by the drive type-classified number of vehicles, and thereby estimates that the total number of all the vehicles located on the road is 50.

Moreover, in this embodiment, the traffic condition estimation unit 217 also estimates the number of vehicles, which try to be charged at one charging facility (here, the charging facility SA2), based on the charging plans (FIG. 2, FIG. 3) included in the probe information. On one right column of a table shown in FIG. 7, an estimation result by the traffic condition estimation unit 217 is shown, the estimation result being of the number (5 in FIG. 7) of vehicles, which try to receive charging electric power at the charging facility SA2, among the plurality (20 in FIG. 7) of EVs located on the road between the point O and the charging facility SA2.

Returning to FIG. 6, in Step S13, the traffic condition estimation unit 217 takes account of the infrastructure information, and corrects the drive type-classified number of vehicles (distributed traffic condition). For example, with regard to the current condition, since spread of the probe vehicle is not sufficient, the total number of probe vehicles on each of the roads, which is estimated in Step S12, and the actual total number of vehicles on each of the roads differ from each other in some cases. Accordingly, in the case where the difference is large, or the like, the traffic condition estimation unit 217 takes account of the infrastructure information, and corrects the drive type-classified number of vehicles. For example, the traffic condition estimation unit 217 divides the total number of vehicles on each of the roads, which is indicated by the infrastructure information, by the total number of vehicles on each of the roads, which is estimated in Step S12, and thereby obtains a ratio of both, then multiplies the drive type-classified number of vehicles, which is estimated in Step S12, by the ratio, and corrects the drive type-classified number of vehicles.

In Step S14, the traffic condition estimation unit 217 stores (saves) distributed traffic condition, which includes the corrected drive type-classified number of vehicles, in the traffic condition DB server 218 (storage). Then, the center-side transmitter 232 transmits (sends) the distributed traffic condition, which is stored in the traffic condition DB server 218, to the outside such as each of the vehicles.

Next, in order to explain effects of the vehicle-side system 101 and the center-side system 201 according to this embodiment, which are composed as described above, a description is made of a probe information system (hereinafter, written as "related probe information system"), which is related to these, by using FIG. 9.

In the related probe information system, the total number of probe vehicles located on each of the roads is transmitted from the center-side system to each of the vehicles. In an example shown in FIG. 9, a distributed traffic condition, which includes the information that the number of probe vehicles located on the road between the point O (current position of a vehicle A that is an EV) and the charging facility SA1 is 50, and that the number of probe vehicles located on the road between the charging facilities SA1 and SA2 is 50, is transmitted to each of the vehicles.

Here, even if the vehicle A receives the distributed traffic condition, a driver of the vehicle A can only make estimation just to an extent where there is a possibility that at most 50 vehicles may be charged at the charging facility SA1, and where at most 50 vehicles may be charged at the charging facility SA2. Hence, the driver cannot determine whether or not to allow the vehicle A to be charged at the charging facilities SA1 and SA2, and in a case where charging congestion is occurring at the charging facilities SA1 and SA2, the driver must wait for a long time in a case of intending to allow the vehicle A to be charged at the charging facilities SA1 and SA2.

As opposed to this, in accordance with the vehicle-side system 101 and the center-side system 201 according to this embodiment, the driver of the vehicle A can acquire the drive type-classified number of vehicles as shown in FIG. 7 and FIG. 8. If the vehicle A receives the drive type-classified number of vehicles as shown in FIG. 7, then the driver of the vehicle A can estimate that a charge waiting time is substantially the same between the charging facilities SA1 and SA2. Meanwhile, if the vehicle A receives the drive type-classified number of vehicles as shown in FIG. 8, then the driver of the vehicle A can estimate that the charge waiting time becomes longer at the charging facility SA2 than at the charging facility SA1. Hence, in this case, the driver of the vehicle A intends to allow the vehicle A to be charged at the charging facility SA1.

As described above, in accordance with the vehicle-side system 101 and the center-side system 201 according to this embodiment, the driver of each of the vehicles can acquire the drive type-classified number of vehicles, and accordingly, can estimate the time of waiting for the energy refilling (for example, waiting for the charge at the charging facilities SA1 and SA2) at the energy refilling facility for each of the drive types to some extent with reference to the acquired drive type-classified number of vehicles. As a result, the driver of each of the vehicles can avoid waiting for the charge (waiting for the refilling) for a long time.

Moreover, if, as shown on the one right column of the table of each of FIG. 7 and FIG. 8, the number of vehicles, which try to be charged at the one charging facility, is estimated based on the charging plan, and the estimated number of vehicles is included in the distributed traffic condition, then estimation accuracy for the charge waiting time can be enhanced.

Note that, in the above description, the center-side system 201 includes the center-side transmitter 232, but is not limited to this. For example, in place of the center-side transmitter 232, the center-side system 201 may include a browsing unit that makes it possible to browse (lay open) the distributed traffic condition at access sources in a case where there are accesses from each of the vehicle-side systems 101 and each of the probe information systems (the outside) in a similar way to a browsing method of a general web page.

Moreover, in the above configuration, in the case where the traffic condition estimation unit 217 can acquire the number of vehicles under refilling at each of the charging facilities (alternatively, the current number of vacancies at each of the charging facilities) from the infrastructure information or the like, the traffic condition estimation unit 217 may have the number of vehicles (or the number of vacancies) included in the distributed traffic condition.

Moreover, the traffic condition estimation unit 217 may acquire the above-mentioned possible traveling speed from the VICS information (infrastructure information), or estimate the above-mentioned possible traveling speed based on the probe vehicle speed information regarding the plurality of probe vehicles 151, and have the possible traveling speed included in the distributed traffic condition.

Furthermore, in the above description, the probe information terminal 105 is a car navigation device. However, without being limited to this, the probe information terminal 105 may be a PND (Portable Navigation Device) or a smart phone for example. Moreover, in the above description, it is described that the control system-information system interface 106 is a wired communication instrument; however, without being limited to this, the control system-information system interface 106 may be a radio communication instrument of Bluetooth (registered trademark) or the like may be used.

Moreover, in the above, the description has been made mainly of an example of the case where the vehicle that receives the distributed traffic condition is the EV, and where the energy refilling facilities and the energy refilling plan are the charging facilities and the charging plan. However, without being limited to this, for example, in a case where the vehicle that receives the distributed traffic condition is the engine vehicle, then similar effects to those in the above description can be obtained if the energy refilling facilities and the energy refilling plan are set as the refueling facilities and the refueling plan. Moreover, for example, in the case where the vehicle that receives the distributed traffic condition is the PHEV (HEV), then similar effects to those in the above description can be obtained if the energy refilling facilities are set as the charging facilities or the refueling facilities, and if the energy refilling plan is set as the charging plan or the refueling plan. Note that this matter also applies to the following description.

<Estimation of Energy Refilling Facility from which Each Vehicle Tries to Receive Energy Refilling>

As mentioned above, if the charging plan that is the energy refilling plan is used, then the number of vehicles (one right column of each of FIG. 7 and FIG. 8), which try to be refilled at one charging facility that is one energy refilling facility, can be estimated. However, on actual use, the center-side system 201 cannot receive the probe information, which includes the energy refilling plan, in some cases. Accordingly, a description is made below of a probe information system, which is capable of enhancing the estimation accuracy for the refilling waiting time without using the energy refilling plan.

Here, as the premise, it is assumed that, in the center-side system 201, there is stored a distribution (hereinafter, written as "distance/number of vehicles-distribution" in some cases) of the drive type-classified number of vehicles with respect to the possible traveling distance that is the maximum distance at which the vehicle is assumed to be capable of traveling by using energy stored at present. Note that, for example, the possible traveling distance of the EV is the same as the charge possible traveling distance described by using FIG. 2 and the like, and for example, the possible traveling distance of the PHEV (HEV) becomes approximately the sum of the charge possible traveling distance described by using FIG. 2 and the like and a distance taken account of the fuel residual quantity.

Incidentally, in the distance/number of vehicles-distribution stored in the center-side system 201, a total traveling distance, which is a maximum distance at which the vehicle is assumed to be capable of traveling in a current vehicle state, is classified in a unit of a fixed possible traveling distance, and an existence probability of the vehicle is preset for each unit. For example, in a case where the total traveling distance is 100 km, and the fixed possible traveling distance is 10 km, then an existence probability X1 is set for a possible traveling distance of 0 to 10 km, an existence probability X2 is set for a possible traveling distance of 10 to 20 km . . . , and an existence probability X10 is set for a possible traveling distance of 90 to 100 km (where X1+X2+ . . . +X10=100%). Here, for convenience of explanation, it is assumed that the existence probabilities X1 to X10 are equal to one another, that is, X1=X2= . . . =X10=10%. However, the existence probabilities X1 to X10 may be weighted and lighted in response to a statistical result.

For each of vehicle drive type (drive type), the traffic condition estimation unit 217 estimates the number of vehicles for each of the possible traveling distances based on the drive type-classified number of vehicles, which is shown in each of FIG. 7 and FIG. 8 and is estimated by the traffic condition estimation unit 217 itself, and on the distance/number of vehicles-distribution. In other words, the traffic condition estimation unit 217 estimates the drive type-classified number of vehicles for each of the possible traveling distances (hereinafter, written as "distance/drive type-classified number of vehicles").

Here, the traffic condition estimation unit 217 estimates that a value obtained by multiplying the drive type-classified number of vehicles by the existence probability is the distance/drive type-classified number of vehicles.

A description is made of an example of this estimation by using FIG. 7. In this example, by the drive type-classified number of vehicles, it is indicated that the number of EVs located on the road between the point O and the charging facility SA1 is 10. In this case, the traffic condition estimation unit 217 estimates that the drive type-classified number of vehicles, in which the possible traveling distance is 0 to 10 km among 10 vehicles shown by the drive type-classified number of vehicles, is 1 (=drive type-classified number of vehicles (10 vehicles)×existence probability X1 (10%). In a similar way, the traffic condition estimation unit 217 estimates that the drive type-classified number of vehicles, in which the possible traveling distance is 10 to 20 km, is 1 . . . , and that the drive type-classified number of vehicles, in which the possible traveling distance is 90 to 100 km, is 1.

Next, based on the distance/drive type-classified number of vehicles, which is obtained by the above estimation, the traffic condition estimation unit 217 estimates the energy refilling facility (charging facility) from which each of the vehicles tries to be receive the energy refilling (charging). Note that, in the following, the energy refilling facility, from which each of the vehicles tries to receive the energy refilling, is written as "refilling-scheduled facility" in some cases.

Here, the traffic condition estimation unit 217 takes account of the traveling route of each of the vehicles and a position (distance) of the energy refilling facility (charging equipment in the case where the drive type is the EV drive form) corresponding to the drive type along with distance/drive type-classified number of vehicles, and thereby estimates the refilling-scheduled facility.

Figure 9:
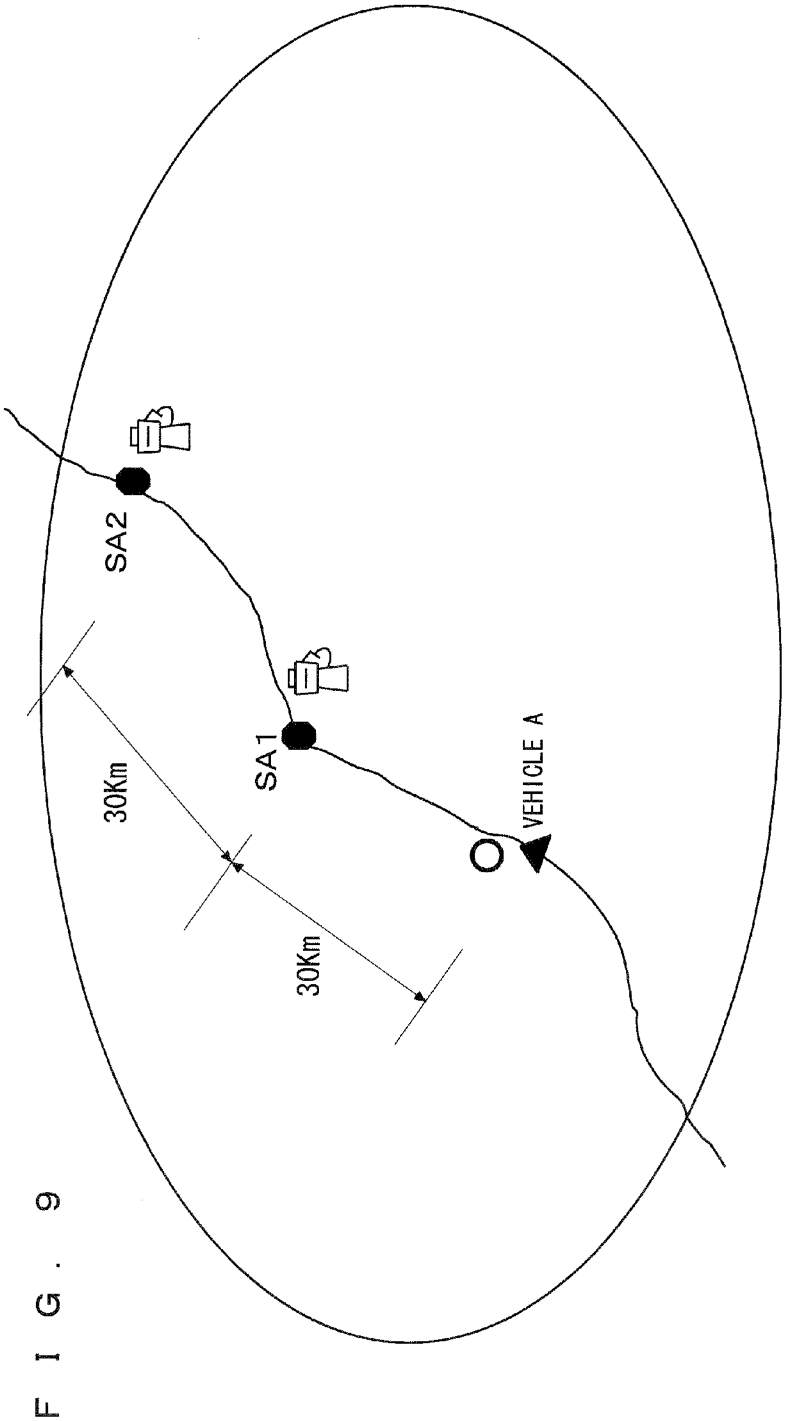
FIG. 9 is a view showing a configuration of a related probe information system.

A description is made of an example of this estimation by using a positional relationship shown in FIG. 9. In this example, the traffic condition estimation unit 217 acquires a traveling route, which sequentially passes through the charging facilities SA1 and SA2, as the traveling route of the vehicle A, which is the EV, from the probe information and the like, and in addition, individually acquires 30 km as the distance between the point O and the charging facility SA1 and the distance between the charging facilities SA1 and SA2, from the map data and the like. In this case, since the distance between the point O and the charging facility SA2 is 60 km, the traffic condition estimation unit 217 estimates that EVs, in each of which the possible traveling distance is 60 km or less among the 10 EVs located on the road between the point O and the charging facility SA1, try to be charged at the charging facility SA1.

Here, as in the above-mentioned example, if the traffic condition estimation unit 217 estimates that the drive type-classified number of vehicles, in which the possible traveling distance is 10 to 20 km, is 1 . . . , and that the drive type-classified number of vehicles, in which the possible traveling distance is 90 to 100 km, is 1, then the traffic condition estimation unit 217 estimates that 6 vehicles, in each of which the possible traveling distance is 60 km or less, try to receive the charging electric power at the charging facility SA1.

The traffic condition estimation unit 217 has the refilling-scheduled facility, which is estimated as described above, included in the distributed traffic condition, and transmits (distributes) the refilling-scheduled facility to each of the vehicles.

In accordance with the vehicle-side system 101 and the center-side system 201, which are as described above, the driver of each of the vehicles can obtain the refilling-scheduled facility, which is information equivalent to the above-mentioned charging plan (energy refilling plan). Hence, the estimation accuracy for the refilling waiting time can be enhanced in a similar way to the charging plan (energy refilling plan).

Note that, in the above description, it is described that the traffic condition estimation unit 217 has the refilling-scheduled facility included in the distributed traffic condition, and transmits the refilling-scheduled facility to each of the vehicles; however, the traffic condition estimation unit 217 is not limited to this. For example, the traffic condition estimation unit 217 may have the distance/drive type-classified number of vehicles included in the distributed traffic condition, and may transmit the distance/drive type-classified number of vehicles to each of the vehicles. Then, if the vehicle (vehicle-side system), which has received the distributed traffic condition, is composed so as to estimate the refilling-scheduled facility based on the distance/drive type-classified number of vehicles in a similar way to the center-side system 201 described above, then similar effects to those in the above description can be obtained.

Moreover, for example, the possible traveling distance is substantially proportional to the fuel residual quantity indicated by the fuel residual quantity information. Therefore, based on the drive type-classified number of vehicles, which is estimated by the traffic condition estimation unit 217, and on the fuel residual quantity information (energy residual quantity information) included in the probe information received by the center-side receiver 231, the traffic condition estimation unit 217 may estimate the drive type-classified number of vehicles for each of the possible traveling distances, which is substantially the same as the above-described distance/drive type-classified number of vehicles, may have the estimated drive type-classified number of vehicles included in the distributed traffic condition, and may transmit the estimated drive type-classified number of vehicles to each of the vehicles.

Note that, here, it is described that the energy residual quantity information is the fuel residual quantity information regarding the fuel residual quantity of gasoline or the like; however, the energy residual quantity information is not limited to this, and may be charge residual quantity information regarding a charge residual quantity.

Moreover, the traffic condition estimation unit 217 may estimate the refilling-scheduled facility in a similar way to the above description based on the distance/drive type-classified number of vehicles obtained from the fuel residual quantity information (energy residual quantity information), have the refilling-scheduled facility included in the distributed traffic condition, and transmit the refilling-scheduled facility to each of the vehicles.

Moreover, regions and countries are also present, where the charging system and the charging inlet are not standardized even if the drive type is the same. Accordingly, as shown in FIG. 2 and the like, in the case where the probe information includes information of the charging inlet, and the traffic condition estimation unit 217 can acquire the information of the charging inlet, then the traffic condition estimation unit 217 may estimate the distance/drive type-classified number of vehicles or the refilling-scheduled facility by taking account of the information of the charging inlet. In a similar way, in the case where the traffic condition estimation unit 217 can acquire the information of the charging system, then the traffic condition estimation unit 217 may estimate the distance/drive type-classified number of vehicles or the refilling-scheduled facility by taking account of the information of the charging system.

Moreover, in a case where the traffic condition estimation unit 217 can acquire a history of the energy refilling facilities from which the energy was refilled in the past, then the traffic condition estimation unit 217 may estimate the distance/drive type-classified number of vehicles or the refilling-scheduled facility while taking positions of the energy refilling facilities as references. Furthermore, the traffic condition estimation unit 217 may assume that each of the vehicles receives the energy refilling at the plurality of energy refilling facilities at an equal probability, and may estimate the distance/drive type-classified number of vehicles or the refilling-scheduled facility.

Moreover, in a case where the traffic condition estimation unit 217 can acquire information as to whether or not the energy refilling facilities are open from the infrastructure information and the like, then the traffic condition estimation unit 217 may estimate the refilling-scheduled facility by taking account of the information as to whether or not the energy refilling facilities are open.

Furthermore, in a solar cell-equipped vehicle that travels by using also electric power of a solar cell, the possible traveling distance is changed depending on the weather. Hence, in a case where the traffic condition estimation unit 217 estimates the distance/drive type-classified number of vehicles or the refilling-scheduled facility for the solar cell-equipped vehicle, then preferably, the traffic condition estimation unit 217 takes account of information of the weather, which is included in the infrastructure information and the like.

<Estimation of Refilling Waiting Time at Energy Refilling Facility>

Next, a description is made of a configuration of estimating the refilling waiting time for the probe vehicle 151. Note that one probe vehicle 151 as an estimation target is written as "estimation target vehicle 151" in some cases, and one energy refilling facility as an estimation target is written as "estimation target refilling facility" in some cases.

Here, based on the above-mentioned refilling-scheduled facility estimated by the traffic condition estimation unit 217, and on the probe vehicle speed information included in the probe information received by the center-side receiver 231 from the estimation target vehicle 151, the traffic condition estimation unit 217 estimates the refilling waiting time of the estimation target vehicle 151 at the energy refilling facility. Note that the refilling-scheduled facility to be used here may be the one obtained from the distance/number of vehicles-distribution, or may be the one obtained from the energy residual quantity information.

First, based on the refilling-scheduled facility, the traffic condition estimation unit 217 acquires the number of vehicles, which try to receive the energy refilling at the estimation target refilling facility, in such a manner as described above, and in addition, acquires a unit refilling time that is a time (for example, an average time), which is required for one vehicle to be refilled at the estimation target refilling facility, from the infrastructure information, the map data and the like. Then, the traffic condition estimation unit 217 multiplies the acquired number of vehicles by the unit refilling time, and thereby obtains a first time from the present point of time to the point of time when the refilling for vehicles of the number of vehicles is completed and it is possible to refill the estimation target vehicle 151 at the estimation target refilling facility.

Moreover, the traffic condition estimation unit 217 acquires a distance between the estimation target vehicle 151 and the estimation target refilling facility from the map data, and in addition, obtains the probe vehicle speed information of the estimation target vehicle 151, which is received by the center-side receiver 231. Then, the traffic condition estimation unit 217 divides the distance, which is obtained from the map data, by a speed indicated by the probe vehicle speed information, and thereby obtains a second time from the present point of time to the point of time when the estimation target vehicle 151 arrives at the estimation target refilling facility.

Then, the traffic condition estimation unit 217 estimates a time, which is obtained by subtracting the second time from the first time, as the refilling waiting time of the estimation target vehicle 151 at the estimation target refilling facility, has the refilling waiting time included in the distributed traffic condition.

In accordance with the vehicle-side system 101 and the center-side system 201 according to this embodiment, which are as described above, the driver of the probe vehicle 151 can acquire the refilling waiting time at the energy refilling facility from which the probe vehicle 151 tries to receive the energy refilling. Hence, the driver can receive the refilling at an appropriate energy refilling facility such as an energy refilling facility in which the refilling waiting time is short.

Note that, in the above description, the following relationship is established: first time=number of vehicles which try to receive energy refilling at estimation target refilling facility×unit refilling time. However, the relationship is not limited to this, and in a case where the traffic condition estimation unit 217 can acquire the number of vehicles under refilling at the estimation target refilling facility and the maximum number of vehicles capable of being refilled at the estimation target refilling facility from the infrastructure information and the like, the following relationship may be established: first time=(number of vehicles which try to receive energy refilling at estimation target refilling facility+number of vehicles under refilling at estimation target refilling facility−maximum number of vehicles capable of being refilled at estimation target refilling facility)×unit refilling time.

Moreover, in the above description, the following relationship is established: second time=distance between attention vehicle and attention refilling facility/speed indicated by probe vehicle speed information. However, the relationship is not limited to this, and in a case where the traffic condition estimation unit 217 can acquire the above-mentioned possible traveling speed, the traffic condition estimation unit 217 may use the possible traveling speed in place of the speed indicated by the probe vehicle speed information.

For example, in a case where the number of vehicles which try to receive the energy refilling at the estimation target refilling facility is 15, the number of vehicles under refilling at the estimation target refilling facility is 0, the maximum number of facilities capable of being refilled at the estimation target refilling facility is 10, and the unit refilling time is 40 minutes, then the traffic condition estimation unit 217 estimates that the first time is 200 minutes (=(15+0−10)×40).

Then, in a case where the possible traveling speed with respect to a 30-km road is 100 km per hour and the possible traveling speed with respect to another 30-km road is 80 km per hour in a traveling route through which the estimation target vehicle 151 arrives at the estimation target refilling facility, the traffic condition estimation unit 217 estimates that the second time is approximately 40 minutes (=0.675 hour=(30/100)+(30/80).

Then, the traffic condition estimation unit 217 estimates that the refilling waiting time of the estimation target vehicle 151 at the estimation target refilling facility is 160 minutes (=200−40). Note that, here, the refilling waiting time is a literal waiting time; however, is not limited to this. For example, the refilling waiting time may include the number of refilling waiting vehicles, which is obtained by dividing the literal waiting time by the unit refilling time. For example, in a case where the refilling waiting time is 160 minutes, and the unit refilling time is 40 minutes, the refilling waiting time may include 4 (=160/40) as the number of refilling waiting vehicles.

<Second Preferred Embodiment>

Figure 10:
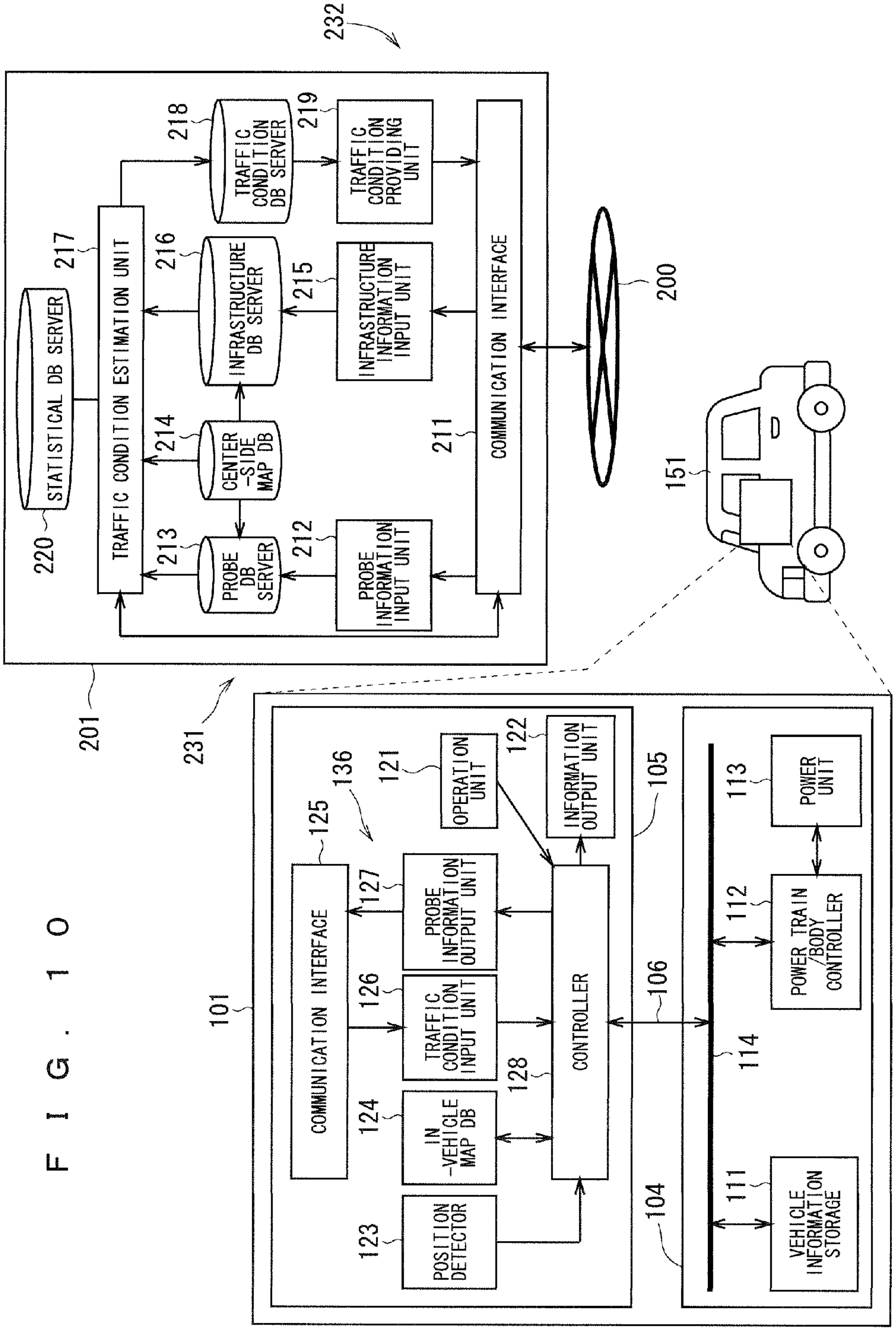
FIG. 10 is a block diagram showing a configuration of a probe information system according to a second preferred embodiment.

FIG. 10 is a block diagram showing a configuration of a probe information system according to a second preferred embodiment, which includes: the vehicle-side system 101; and the center-side system 201. In this embodiment, even in a case where the traffic condition estimation unit 217 of the center-side system 201 cannot acquire the probe information including the drive type information, the traffic condition estimation unit 217 is made capable of estimating the drive type-classified number of vehicles. Hereinafter, in a description of this embodiment, the same reference numerals are assigned to those which are the same as or similar to the constituent elements described in the first preferred embodiment, and a description thereof is omitted.

As shown in FIG. 10, the probe information system according to this embodiment is different from the probe information system according to the first preferred embodiment in that a statistical DB server 220 is provided in the center-side system 201. In this embodiment, in this statistical DB server 220, a ratio for each of the drive types (hereinafter, written as "drive type ratio" in some cases) with respect to the total number of probe vehicles 151 on each of the roads is stored. Here, it is assumed that the drive type ratio is set as: engine vehicle: PEHV: EV=60(%):30(%):10 (%).

For a road from which the drive type information is not received by the center-side receiver 231, the traffic condition estimation unit 217 estimates the drive type-classified number of vehicles by using this drive type ratio.

A description is made of an example of this estimation by using FIG. 11. Note that it is assumed that, based on the probe vehicle position information (for example, the number of vehicle ID types shown in FIG. 2 and the like) received by the center-side receiver 231, the traffic condition estimation unit 217 has already obtained the total number (here, 50 for each) of probe vehicles 151 located on the road between the point O and the charging facility SA1 and on the road between the charging facilities SA1 and SA2.

The traffic condition estimation unit 217 multiplies the total number of probe vehicles 151 between the point O and the charging facility SA1 by the drive type ratio, and thereby estimates that the number of engine vehicles, the number of PHEVs and the number of EVs, all the vehicles being located between the point O and the charging facility SA1, are 30 (=50×60%), 15 (=50×30%) and 5 (=50×10%) as the drive type-classified number of vehicles. In a similar way, the traffic condition estimation unit 217 multiplies the total number of probe vehicles 151 between the charging facilities SA1 and SA2 by the drive type ratio, and thereby estimates that the number of engine vehicles, the number of PHEVs and the number of EVs, all the vehicles being located between the charging facilities SA1 and SA2, are 30 (=50×60%), 15 (=50×30%) and 5 (=50×10%) as the drive type-classified number of vehicles.

In accordance with the vehicle-side system 101 and the center-side system 201 according to this embodiment, which are as described above, even if the drive type information cannot be acquired, the drive type-classified number of vehicles can be estimated, and accordingly, a probe information system, which is easy to use, can be provided.

Note that a configuration may be adopted so that the statistical DB server 220 can store the drive type ratio for each of time, day of week and road, and that the traffic condition estimation unit 217 can acquire the drive type ratio corresponding to the date and time at the time of the estimation and to the estimation target road, and can use the drive type ratio for the estimation of the drive type-classified number of vehicles.

Moreover, in a similar way to the first preferred embodiment, the traffic condition estimation unit 217 may estimate the distance/drive type-classified number of vehicles, the refilling-scheduled facility, or the refilling waiting time by using the drive type-classified number of vehicles, which is estimated here.

Moreover, in a case where there mixedly exist the probe vehicles for which it has been possible to obtain the drive type information and the probe vehicles (imperfect probe vehicles) for which it has not been possible to obtain the drive type information, then it may be regarded that a ratio of the drive types of the probe vehicles for which it has been possible to obtain the drive type information may be the same as a ratio of the drive types of the probe vehicles for which it has not been possible to obtain the drive type information, and the ratio described above may be used to replace the drive type-classified number of vehicles for the whole of the probe vehicles on the road section.

Moreover, in the case where the probe vehicles and the non-probe vehicles mixedly exist, and it has been possible to obtain the number of the whole of vehicles in the road section by a vehicle sensing infrastructure system, the ratio of the drive types of the probe vehicles may be adapted to the whole of the road section, and the drive type-classified number of vehicles may be estimated.

Moreover, in a case where the vehicle sensing infrastructure system can sense the drive type (vehicle drive type), the drive type-classified number of vehicles in the road section can be obtained from the vehicle sensing infrastructure system. In this case, the probe vehicles are unnecessary.

Moreover, in a case where there mixedly exist: vehicles in each of which the drive type can be sensed by the vehicle sensing infrastructure system by using performance or a communication system with the vehicle; and vehicles in each of which the drive type cannot be sensed thereby, then a vehicle ratio in which the drive type can be sensed may be adapted to the whole of the vehicles, and the drive type-classified number of vehicles in the section may be estimated.

Moreover, in a case where there mixedly exist: the vehicles in each of which the drive type can be sensed by the vehicle sensing infrastructure system by using the performance or the communication system with the vehicle; the vehicles in each of which the drive type cannot be sensed thereby; and the probe vehicles, then the drive type-classified number of vehicles in the section may be estimated by a determined estimation rule.

Moreover, in the above description, the traffic condition estimation unit 217 estimates the drive type-classified number of vehicles by using the total number of probe vehicles 151, which is based on the probe vehicle position information; however, without being limited to this, the traffic condition estimation unit 217 may acquire the total number of vehicles, which are located on each of the roads (each of the links), from a roadside vehicle identification sensor such as a DSRC (Dedicated Short Range Communications), and may use the total number of vehicles for the estimation of the drive type-classified number of vehicles. Furthermore, the traffic condition estimation unit 217 may estimate the drive type-classified number of vehicles by using a road-to-vehicle communication such as an ETC (Electronic Toll Collection System) and a beacon.

Moreover, based on a type of the information used for the estimation of the drive type-classified number of vehicles, the traffic condition estimation unit 217 may obtain a reliability of the drive type-classified number of vehicles, and may have the reliability included in the distributed traffic condition. For example, in a case where the reliability is represented by one number among "1 to 5", and the reliability is increased as the number is becoming larger, in a case where the information used for the estimation of the drive type-classified number of vehicles is information obtained more recently, such as the drive type information, then the traffic condition estimation unit 217 sets a reliability of the drive type-classified number of vehicles at 5. Meanwhile, in a case where the information used for the estimation of the drive type-classified number of vehicles is information such as the vehicle drive type ratio, which is obtained at a point of time apart from the present point of time, then the traffic condition estimation unit 217 sets a reliability of the drive type-classified number of vehicles at 1. Processing using this reliability is described in a next embodiment.

<Third Preferred Embodiment>

Figure 12:
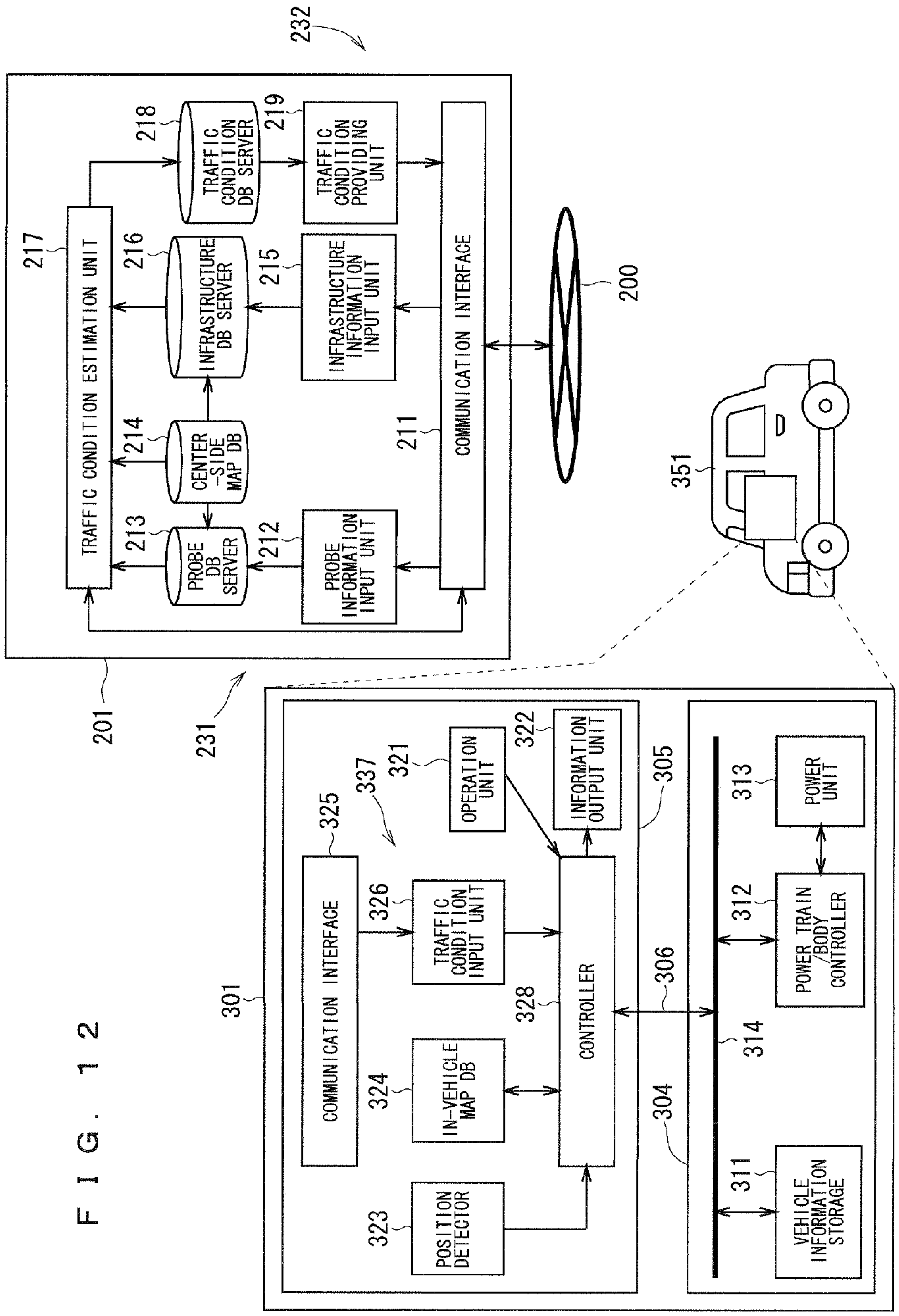
FIG. 12 is a block diagram showing a configuration of a probe information system according to a third preferred embodiment.

FIG. 12 is a block diagram showing a configuration of a probe information system according to a third preferred embodiment of the present invention. In the first and second preferred embodiments, the description is mainly made of the processing until the distributed traffic condition is transmitted from the center-side system 201. In this embodiment, a description is made of the vehicle-side system 301 that receives and uses the distributed traffic condition.

Note that, as shown in FIG. 12, a block configuration of the vehicle-side system 301 according to this embodiment is substantially the same as the block configuration of the vehicle-side system 101 according to the first preferred embodiment. Accordingly, among the constituent elements of the vehicle-side system 301 according to this embodiment, with regard to those which are the same as or similar to the constituent elements of the vehicle-side system 101 according to the first preferred embodiment, only reference numerals are changed, and the same names are used, and a duplicate description is omitted. Moreover, it is assumed that the center-side system according to this embodiment is the same as the center-side system 201 according to the first preferred embodiment.

However, in the following, the description is made on the assumption that the vehicle-side system 301 according to this embodiment is mounted on a predetermined vehicle (hereinafter, written as "vehicle 351" in some cases), and that the vehicle 351 is a non-probe vehicle. Then, for the vehicle-side system 301 of the non-probe vehicle, the function to transmit the probe information to the center-side system 201 described in the first preferred embodiment is not essential, and accordingly, is omitted here.

Next, a description is made in detail of a configuration of the vehicle-side system 301. The vehicle-side system 301 includes: a vehicle controller 304 that controls the vehicle 351 based mainly on the operations of the driver; an information terminal 305 that handles various pieces of information; and a control system-information system interface 306 that connects these to each other.

Among them, the vehicle controller 304 includes: a vehicle information storage 311; a power train/body controller 312; and a power unit 313 (speed detector) that detects own vehicle speed information (vehicle speed information) that is information regarding the speed of the vehicle 351. Meanwhile, the information terminal 305 includes: an operation unit 321; an information output unit 322; a position detector 323 that detects own vehicle position information (vehicle position information) that is information regarding a position of the vehicle 351; an in-vehicle map DB 324; a communication interface 325; a traffic condition input unit 326; and a controller 328.

Then, in the vehicle-side system 301 according to this embodiment, the communication interface 325 and the traffic condition input unit 326 compose a vehicle-side receiver 337. The vehicle-side receiver 337 composed as described above receives the distributed traffic condition, which includes the drive type-classified number of vehicles, from the center-side system 201.

The controller 328 acquires the drive type-classified number of vehicles (hereinafter, written as "same-category drive type-classified number of vehicles" in some cases) of the drive type, to which the vehicle 351 belongs, from the drive type-classified number of vehicles, which is included in the distributed traffic condition received from the vehicle-side receiver 337.

For example, in a case where the drive type stored in the vehicle information storage 311 indicates the EV drive form, the controller 328 acquires the drive type-classified number of vehicles of the EV drive form as the same-category drive type-classified number of vehicles. Then, in this case, in a case where the center-side system 201 transmits the drive type-classified number of vehicles as shown in FIG. 7, then as the same-category drive type-classified number of vehicles, the controller 328 acquires information that the number of EVs on the road between the point O and the charging facility SA1 is 10, and that the number of EVs on the road between the charging facilities SA1 and SA2 is 10.

Figure 13:
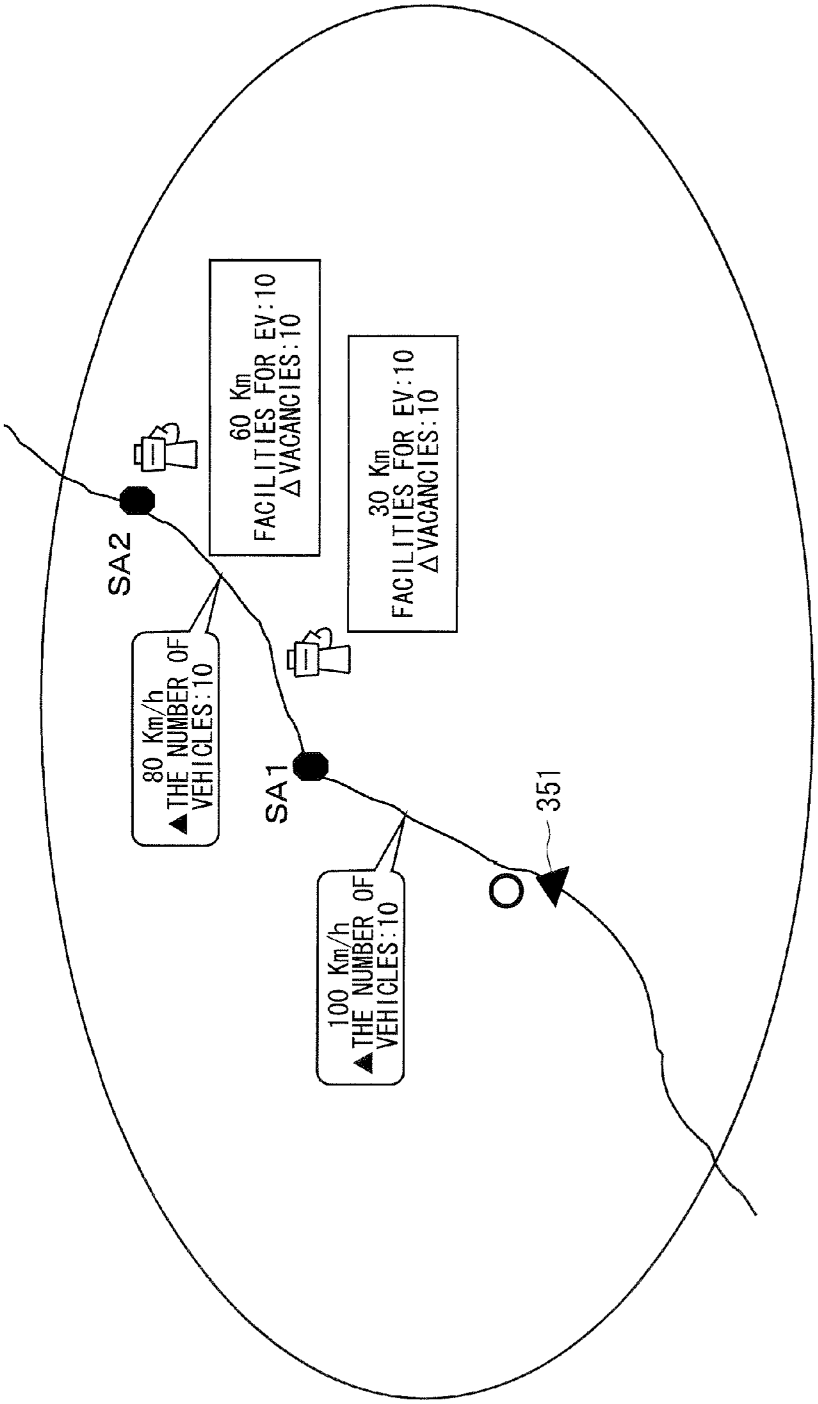
FIGS. 13 and 14 are views showing display to be performed by a vehicle-side system according to the third preferred embodiment.
Figure 14:
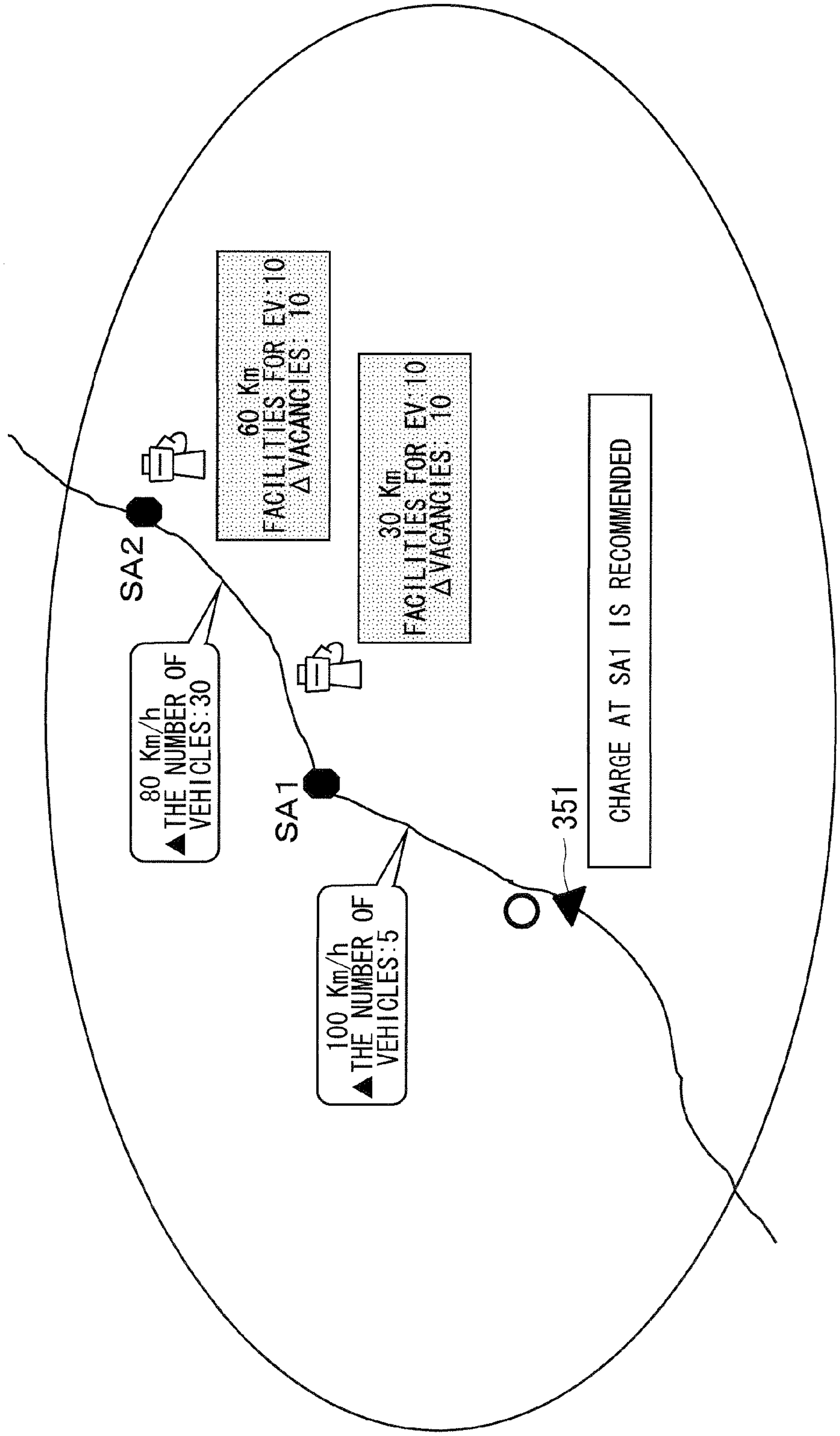

The controller 328 controls the information output unit 322 based on the same-category drive type-classified number of vehicles. FIG. 13 and FIG. 14 are views showing display to be performed by the information output unit 322 by control of the controller 328. FIG. 13 is a display to be performed by the information output unit 322 in a case where the center-side system 201 transmits the drive type-classified number of vehicles as shown in FIG. 7, and FIG. 14 is a display to be performed by the information output unit 322 in a case where the center-side system 201 transmits the drive type-classified number of vehicles as shown in FIG. 8.

As shown in FIG. 13 and FIG. 14, in this embodiment, the information output unit 322 displays a map indicated by the map data of the in-vehicle map DB 324, and in addition, on the map, displays a position of the vehicle 351, which is indicated by the own vehicle position information detected by the position detector 323, a traveling route of the vehicle 351, which is searched by a navigation function of the controller 328, and the number of vacancies at the charging facilities SA1 and SA2, which is indicated by the infrastructure information and the like. Note that, in a case where the vehicle-side receiver 337 receives the distributed traffic condition including the possible traveling speed, the information output unit 322 may display the possible traveling speed in a balloon as shown in FIG. 13 and FIG. 14.

Here, as shown in these FIG. 13 and FIG. 14, the information output unit 322 displays the same-category drive type-classified number of vehicles in the balloon. In accordance with the vehicle-side system 301 according to this embodiment as described above, the driver of the vehicle 351 can estimate the charge waiting time at the charging facilities SA1 and SA2 to some extent with reference to the display that is based on the same-category drive type-classified number of vehicles. As a result, the long-time charge waiting (refilling waiting) can be avoided.

Note that, in a similar way to the first and second preferred embodiments, the controller 328 may estimate the same-category drive type-classified number of vehicles for each of the possible traveling distances based on the same-category drive type-classified number of vehicles. Alternatively, in a case where the vehicle-side receiver 337 receives the distributed traffic condition, which includes the drive type-classified number of vehicles for each of the possible traveling distances, from the center-side system 201, the controller 328 may acquire the same-category drive type-classified number of vehicles for each of the possible traveling distances from the distributed traffic condition. Then, a configuration may be adopted, in which the controller 328 can control the information output unit 322 based on the same-category drive type-classified number of vehicles for each of the possible traveling distances in order that the same-category drive type-classified number of vehicles for each of the possible traveling distances can be displayed on the information output unit 322 in these cases.

In accordance with the configuration as described above, the estimation accuracy for the refilling waiting time by the driver can be enhanced.

Moreover, in a similar way to the first preferred embodiment, the controller 328 may estimate an energy refilling facility (hereinafter, written as "same-category refilling-scheduled facility" in some cases), from which each of the vehicles, of which vehicle category is the same as that of the vehicle 351, tries to receive the energy refilling, based on the drive type-classified number of vehicles for each of the possible traveling distances. Alternatively, in a case where the vehicle-side receiver 337 receives the distributed traffic condition, which includes the refilling-scheduled facility, from the center-side system 201, the controller 328 may acquire the same-category refilling-scheduled facility from the distributed traffic condition. Then, a configuration may be adopted so that the controller 328 controls the information output unit 322 based on the same-category refilling-scheduled facility in order that the same-category refilling-scheduled facility can be displayed on the information output unit 322 in these cases. In accordance with the configuration as described above, the estimation accuracy for the refilling waiting time by the driver can be enhanced.

Moreover, in a similar way to the first preferred embodiment, the controller 328 may estimate the refilling waiting time at the energy refilling facility, from which the vehicle 351 tries to receive the energy refilling, based on the same-category refilling-scheduled facility (or the drive type-classified number of vehicles for each of the possible traveling distances, which serves as an origin thereof) and on the own vehicle speed information that is the information regarding the speed of the vehicle 351, which is detected by the power unit 313 (speed detector). Alternatively, the controller 328 may estimate the traveling route of the vehicle 351 (own vehicle) and a position of the vehicle 351 after a predetermined time, and may estimate the above-described refilling waiting time based on the same-category refilling-scheduled facility (or the drive type-classified number of vehicles for each of the traveling distances, which serves as an origin thereof) and on the position of the vehicle 351 after the predetermined time. Then, a configuration may be adopted so that the controller 328 can control the information output unit 322 based on the refilling waiting time of the vehicle 351 in order that the refilling waiting time of the vehicle 351 can be displayed on the information output unit 322 in this case. In accordance with the configuration as described above, the driver of the vehicle 351 can acquire the refilling waiting time. Hence, the driver can be refilled at an appropriate energy refilling facility such as the energy refilling facility in which the refilling waiting time is short.

Moreover, the controller 328 may estimate the refilling waiting time of the vehicle 351 for each of the plurality of energy refilling facilities, and may estimate the energy refilling facility, from which the vehicle 351 should receive the energy refilling, based a result of the estimation. For example, the controller 328 may estimate that one energy refilling facility in which the refilling waiting time is the shortest is the energy refilling facility from which the vehicle 351 should receive the energy refilling Then, a configuration may be adopted so that the controller 328 can control the information output unit 322 based on the estimated energy refilling facility in order that the vehicle 351 can be recommended to be refilled at the estimated energy refilling facility in this case.

A description is specifically made of this configuration by using FIG. 14. In an example shown in FIG. 14, the distance of the section between the point O and the charging facility SA1 is 30 km, the same-category drive type-classified number of vehicles in that section is 5, and the possible traveling speed in that section is 100 km; the distance of the section between the charging facilities SA1 and SA2 is 30 km, the same-category drive type-classified number of vehicles in that section is 30, and the possible traveling speed in that section is 80 km; the current number of vacancies at the charging facilities SA1 and SA2 is 10, and the maximum number of vehicles capable of being refilled at the same is 10. It is assumed that, under this state, the controller 328 estimates that the refilling waiting time occurs at the charging facility SA2, and estimates that the refilling waiting time does not occur at the charging facility SA1 in the meanwhile. In this case, the controller 328 controls the information output unit 322 based on the above-described one energy refilling facility so that the recommendation to be refilled at the charging facility SA1 can be displayed on the information output unit 322 as shown in FIG. 14.

In accordance with the configuration as described above, the driver of the vehicle 351 can automatically acquire the appropriate energy refilling facility, for example, such as the energy refilling facility in which the refilling waiting time is short.

Note that, though FIG. 14 shows an example of displaying the appropriate energy refilling facility by a telop, the display is not limited to this, and the energy refilling facility in which the refilling waiting time occurs and the energy refilling facility in which the refilling waiting time does not occur may be displayed so as to be distinguishable. For example, for the energy refilling facility in which the refilling waiting time occurs, display of a balloon in which contents of the indication thereof are described may be added, and in addition, a refilling waiting time at that refilling facility may be displayed. Moreover, the energy refilling facility in which the refilling waiting time occurs may be displayed by a color of danger (for example, red), and the energy refilling facility in which the refilling waiting time does not occur may be displayed by a color of safety (for example, blue).

Moreover, the vehicle 351 may be visually guided to the appropriate energy refilling facility by using balloon display and the like, or may change a size, color and height of the balloon or the energy refilling facility, which is displayed on the information output unit 322, in response to length of the waiting time. Moreover, the display of the refilling waiting time at the energy refilling facility, which is initially scheduled, may be performed.

Moreover, in a case where the vehicle-side receiver 337 receives the distributed traffic condition, which includes the reliability as described in the second preferred embodiment, from the center-side system 201, the controller 328 may control the information output unit 322 by taking account of the reliability. For example, in a case where the charge waiting time (number of charge waiting vehicles) at the charging facility SA2 is 3, display of "3 vehicles are expected to wait at SA2" may be performed in a case where the reliability is 5, display of "3 vehicles probably wait at SA2" may be performed in a case where the reliability is 3, and display of "2 vehicles are estimated to wait at SA2" may be performed in a case where the reliability is 1.

As described above, the controller 328 changes the contents (here, an expression regarding assurance of the estimation), which are displayed on the information output unit 322, in response to the reliability, whereby the driver of the vehicle 351 can get to know a possibility of being capable of receiving the refilling at the appropriate energy refilling facility.

Moreover, in a case where the same-category refilling-scheduled facility differs from that in the energy refilling plan such as the charging plan initially made, the controller 328 may control the information output unit 322 to issue a warning, which indicates that the plan is changed, and to guide the vehicle 351 to the same-category refilling-scheduled facility.

Note that, in the above description, the description has been made of the case where the vehicle 351 (vehicle-side system 301) has received the distributed traffic condition including the drive type-classified number of vehicles. However, in a case where the vehicle 351 (vehicle-side system 301) has been able to receive the distributed traffic condition, which includes the total number of vehicles on each of the roads, in place of the fact that the vehicle 351 has not been able to receive the distributed traffic condition including the drive type-classified number of vehicles, the controller 328 may estimate the drive type-classified number of vehicles by using the drive type ratio in a similar way to the second preferred embodiment.

Moreover, in the above description, the description has been made where the information output unit 322 performs the display; however, the information output unit 322 is not limited to this, and the information output unit 322 may perform notification in place of the display, or alternatively, the information output unit 322 may perform both of the display and the notification. Note that, as the notification of the information output unit 322, for example, a voice warning may be outputted at appropriate timing, or a voice that guides the vehicle to an appropriate energy refilling facility may be outputted.

Moreover, in the above description, the controller 328 controls the information output unit 322 based on various pieces of information; however, the controller 328 is not limited to this, and may control the very vehicle 351 in such an aspect as traveling of the vehicle 351.

Moreover, in a case where the vehicle 351 is the solar cell-equipped vehicle, then in a similar way to the first preferred embodiment, the controller 328 may estimate the same-category drive type-classified number of vehicles for each of the possible traveling distances, the same-category refilling-scheduled facility or the refilling waiting time by taking account of the information of the weather. Furthermore, in a similar way to the first preferred embodiment, the controller 328 may estimate the same-category drive type-classified number of vehicles for each of the possible traveling distances, the same-category refilling-scheduled facility or the refilling waiting time by taking account of the information of the charging inlet or the charging system.

Moreover, in the above description, it is defined that the vehicle 351 is the non-probe vehicle. However, the vehicle 351 is not limited to this, and the vehicle 351 may have equivalent configurations to those of the probe vehicle 151 including the vehicle-side system 101 described in the first preferred embodiment and the like. That is to say, the vehicle-side system 301 may include the vehicle-side transmitter, which transmits, to the center-side system 201, the probe information including the own vehicle position information and the drive type information of the vehicle 351.

Moreover, in each of the first to third preferred embodiments described above, the vehicle-side system mainly receives the traffic condition from the center-side system located on the outside of the vehicle; however, the traffic condition may be received not only from the center-side system but also from VICS traffic information by FM multiplex broadcasting, an on-road facility such as a radio beacon and a light beacon, which is located on the outside of the vehicle, or a DSRC or other road-to-vehicle communication structure, which is located on the outside of the vehicle and provides the traffic condition. Furthermore, the traffic condition may be inputted from a communication between the vehicles and other communication means.

Note that, in the present invention, within the scope of the present invention, it is possible to freely combine the respective embodiments, and to appropriately modify and omit the respective embodiments.

EXPLANATION OF REFERENCE NUMERALS

101, 301 vehicle-side system, 113, 313, power unit, 123, 323 position detector, 128, 328 controller, 136 vehicle-side transmitter, 151 probe vehicle, 201 center-side system, 217 traffic condition estimation unit, 231 center-side receiver, 232 center-side transmitter, 122, 322 information output unit, 337 vehicle-side receiver, 351 vehicle, SA1, SA2 charging facility

The invention claimed is:

1. A center-side system in a probe information system, the center-side system receiving upload of traffic information from a vehicle-side system mounted on probe vehicles, comprising:

a receiver connected to a communication network connected to said vehicle-side system;

a transmitter; and a processor configured to execute a process of obtaining, via the receiver, vehicle position information that is information regarding positions of said probe vehicles, and drive type information that is information regarding drive types of said probe vehicles, estimating a traffic condition, the traffic condition including a drive type-classified quantification of vehicles, which includes an estimated total number of vehicles for each of said drive types of said probe vehicles on each of roads, based on said vehicle position information obtained by said receiver and on said drive type information obtained by said receiver, and at least one of:

transmitting, via the transmitter, to a destination outside of said center-side system, said estimated traffic condition including said drive type-classified quantification of vehicles, and allowing said estimated traffic condition including said drive type-classified quantification of vehicles to be browsed by a browser having access from the outside;

wherein said process estimates said drive type-classified quantification of vehicles for each of possible traveling distances based on said drive type-classified quantification of vehicles of said estimated traffic condition, and on a distribution of said drive type-classified quantification of vehicles with respect to the possible traveling distances, and has said drive type-classified quantification of vehicles for each of the possible traveling distances included in said estimated traffic condition.

2. The center-side system according to claim 1, wherein said process estimates an energy refining facility, from which each of the vehicles tries to receive energy refilling, based on said drive type-classified quantification of vehicles for each of the possible traveling distances, and has the energy refining facility included in said estimated traffic condition.

3. The center-side system according to claim 2, wherein said receiver receives, from said vehicle-side system, vehicle speed information that is information regarding a speed of said probe vehicle, and said process further estimates a waiting time of said probe vehicle at said energy refining facility based on said estimated energy refilling facility, and on said vehicle speed information received by said receiver, and has the waiting time included in said traffic condition.

* * * * *